United States Patent
Henderson et al.

(10) Patent No.: US 11,181,607 B2
(45) Date of Patent: Nov. 23, 2021

(54) SYSTEM AND METHOD FOR DETERMINING GEOLOCATION DETERMINATION FIDELITY

(71) Applicant: Raytheon Company, Waltham, MA (US)

(72) Inventors: Shawn Henderson, Waltham, MA (US); Jerry Hosterman, Waltham, MA (US); Steven Eslinger, Waltham, MA (US); Megan J. Roberts, Waltham, MA (US)

(73) Assignee: Raytheon Company, Waltham, MA (US)

( * ) Notice: Subject to any disclaimer, the term of this patent is extended or adjusted under 35 U.S.C. 154(b) by 105 days.

(21) Appl. No.: 16/576,314

(22) Filed: Sep. 19, 2019

(65) Prior Publication Data

US 2021/0088621 A1 Mar. 25, 2021

(51) Int. Cl.
*G01S 5/02* (2010.01)
(52) U.S. Cl.
CPC .................... *G01S 5/021* (2013.01)
(58) Field of Classification Search
CPC ....................................................... G01S 5/021
See application file for complete search history.

(56) References Cited

U.S. PATENT DOCUMENTS

| | | | |
|---|---|---|---|
| 2010/0123627 A1* | 5/2010 | Reynolds | G01S 5/021 342/451 |
| 2017/0003376 A1* | 1/2017 | Wellman | G01S 5/0252 |
| 2018/0203094 A1* | 7/2018 | Gudim | G01S 5/04 |
| 2018/0231632 A1* | 8/2018 | Tsunoda | G01S 5/0263 |

* cited by examiner

*Primary Examiner* — Manuel A Rivera Vargas
(74) *Attorney, Agent, or Firm* — Burns & Levinson, LLP; Joseph M. Maraia

(57) ABSTRACT

In a geolocation system, ancillary parameter values, i.e., those produced during the geolocation process but not directly related to the calculation of the geolocation, are recorded and stored. These "ancillary" parameter values include signal characterization data and secondary measurements produced in the calculation of the geolocation. These parameter values are processed, in one approach, with respect to a weighted matrix in order to determine a confidence or fidelity value of the determined geolocation. Confidence is an indication of the likelihood that the geolocation result produced is in fact the desired target and that the identified location has a reasonable degree of quality so as to be practical or accurate.

20 Claims, 5 Drawing Sheets

| Parameter Type 504 | Weight (TWF) 508 | Rule 512 | Threshold(s) 516 | Impact Value (MPV) 520 |
|---|---|---|---|---|
| CAF-Roughness (CAFR) 502A | 0.5 508A | Minimum 508B | CAFR ! 2.5  516A | 1  520A |
| | | | 2.5 < CAFR ! 4.7  516B | 0.8  520B |
| | | | 4.7 < CAFR ! 6.2  516C | 0.5  520C |
| | | | CAFR > 6.2  516D | 0.25  520D |
| CAF-SNR (CAFSNR) 502B | 3 | Mean | CAFSNR ! 20.0 | 0.5 |
| | | | 20.0 < CAFSNR ! 25.0 | 0.75 |
| | | | 25.0 < CAFSNR ! 30.0 | 0.95 |
| | | | CAFSNR > 30.0 | 0.99 |
| Number of Collectors (NOC) 502C | 2 | | NOC ! 2 | 0.3 |
| | | | NOC = 3 | 0.7 |
| | | | NOC = 4 OR NOC = 5 | 0.98 |
| | | | NOC > 5 | 0.999 |
| Bit Quality (BQ) 502D | 0 | | BQ ! 0.75 | 0.2 |
| | | | 0.75 < BQ ! 0.95 | 0.3 |
| | | | BQ > 0.95 | 0.9 |

FIG. 5

SYSTEM AND METHOD FOR DETERMINING GEOLOCATION DETERMINATION FIDELITY

GOVERNMENT SUPPORT

This invention was made with Government support. The Government has certain rights in the invention.

BACKGROUND

In the known field of determining a geolocation of a signal emitter or "target," a measured geolocation point corresponding to the signal emitter has an associated confidence value. This confidence value uses measurement bias and receiver geometry to define an ellipse with a given probability that the transmitter lies within it. Thus, for example, a measured geolocation point A, believed to correspond to the transmitter, will have an associated ellipse that indicates that there is a 95% chance, based on the measurement bias and receiver geometry, that the transmitter lies within the ellipse.

What is needed, however, is an improvement in determining the confidence value corresponding to a measured geolocation determination.

BRIEF SUMMARY OF THE INVENTION

In one aspect of the present disclosure there is provided a method of determining a confidence value (FV) corresponding to a signal emitter geolocation determined by a geolocation system, the method comprising: retrieving a set of geolocation system parameter values generated by the geolocation system while determining the signal emitter geolocation, wherein each system parameter value has a respective parameter type and at least one of the system parameter values is of a type that is not used by the geolocation system to determine the signal emitter geolocation; and determining the confidence value (FV) as a function of at least one of: a respective parameter type weighting factor (TWF) assigned to each distinct parameter type in the retrieved parameter values set; a sum of the TWFs in the retrieved parameter value set; a primary parameter value identified for each group of retrieved geolocation system parameter values having a same parameter type; and a corresponding impact value (MPV) assigned to the identified primary parameter value.

The method can include determining the confidence value (FV) as a function of at least one of: a rule for determining the primary parameter value; and a comparison of the primary parameter value to at least one threshold range, wherein the corresponding impact value (MPV) is assigned to the identified primary parameter value as function of the comparison of the primary parameter value to at least one threshold range.

The parameter type can be one of: a measure of Cross Ambiguity Function (CAF) roughness; a measure of CAF Signal-Noise Ratio (CAF SNR); a measure of a number of signal collectors; a duty cycle value of a signal from the signal emitter; an indication of use of demodulation/remodulation processing; or a measure of a quality of demodulated bits used in the geolocation determination.

The method can further comprise: assigning a respective parameter type weighting factor (TWF) to each distinct parameter type in the retrieved parameter values set; and for each group of retrieved geolocation system parameter values having a same parameter type: (a) setting a current parameter type weighting factor (cTWF) to the parameter type weighting factor TWF of the current parameter type; (b) identifying the primary parameter value; (c) assigning a corresponding impact value (MPV) to the identified primary parameter value; (d) setting the confidence value FV=(FV+(MPV*cTWF)); and (e) setting the total weight value WTOT=(WTOT+cTWF); and setting the confidence value FV=(FV/WTOT) when steps (a)-(e) have been executed for each group of retrieved geolocation system parameter values having a same parameter type.

In another aspect of the present disclosure, there is disclosed a system for determining a confidence value (FV) corresponding to a signal emitter geolocation as determined by a geolocation system, the system comprising: a processor coupled to the geolocation system and configured to implement a method of: retrieving a set of geolocation system parameter values generated by the geolocation system while determining the signal emitter geolocation, wherein each system parameter value has a respective parameter type and at least one of the system parameter values is of a type that is not used by the geolocation system to determine the signal emitter geolocation; and determining the confidence value (FV) as a function of at least one of: a respective parameter type weighting factor (TWF) assigned to each distinct parameter type in the retrieved parameter values set; a sum of the TWFs in the retrieved parameter value set; a primary parameter value identified for each group of retrieved geolocation system parameter values having a same parameter type; and a corresponding impact value (MPV) assigned to the identified primary parameter value.

In yet another aspect of the present disclosure, there is a tangible computer-readable medium storing instructions thereon that, when executed by a processor coupled to a geolocation system, causes the processor to implement a method of determining a confidence value corresponding to a determination of a geolocation of a signal emitter by the geolocation system, the method comprising: retrieving a set of geolocation system parameter values generated by the geolocation system while determining the signal emitter geolocation, wherein each system parameter value has a respective parameter type and at least one of the system parameter values is of a type that is not used by the geolocation system to determine the signal emitter geolocation; and determining the confidence value (FV) as a function of at least one of: a respective parameter type weighting factor (TWF) assigned to each distinct parameter type in the retrieved parameter values set; a sum of the TWFs in the retrieved parameter value set; a primary parameter value identified for each group of retrieved geolocation system parameter values having a same parameter type; and a corresponding impact value (MPV) assigned to the identified primary parameter value.

BRIEF DESCRIPTION OF THE DRAWINGS

Various aspects of the present disclosure are discussed below with reference to the accompanying figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, however, not every component may be labeled in every drawing. The figures are provided for the purposes of illustration and explanation and are not intended as a definition of the limits of the disclosure. In the figures:

FIG. 5 is a representation of an information database in accordance with an aspect of the present disclosure.

DETAILED DESCRIPTION

Figure 1:
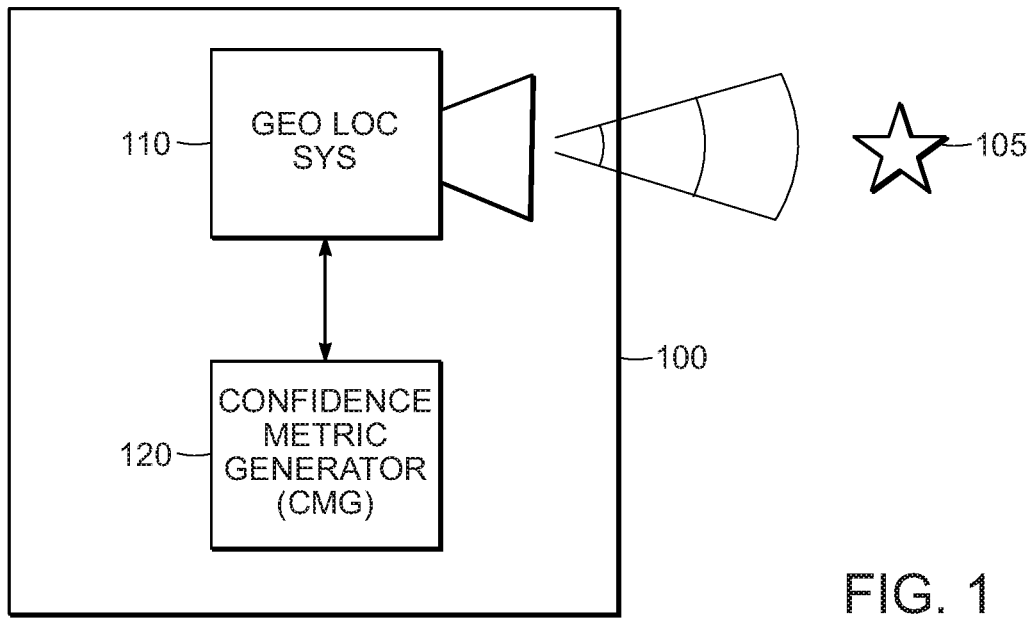
FIG. 1 is a system for determining a geolocation of a target and a corresponding confidence value in accordance with an aspect of the present disclosure.

In the following detailed description, numerous specific details are set forth in order to provide a thorough understanding of the aspects of the present disclosure. It will be understood by those of ordinary skill in the art that these embodiments may be practiced without some of these specific details. In other instances, well-known methods, procedures, components and structures may not have been described in detail so as not to obscure the details of the present disclosure.

Prior to explaining at least one embodiment of the present disclosure in detail, it is to be understood that the disclosure is not limited in its application to the details of construction and the arrangement of the components set forth in the following description or illustrated in the drawings. Also, it is to be understood that the phraseology and terminology employed herein are for the purpose of description only and should not be regarded as limiting.

It is appreciated that certain features, which are, for clarity, described in the context of separate embodiments, may also be provided in combination in a single embodiment. Conversely, various features, which are, for brevity, described in the context of a single embodiment, may also be provided separately or in any suitable sub-combination.

A survey of the available literature regarding geolocation reveals that the confidence in the accuracy of a geolocation determination relies entirely on the error ellipse and its underlying calculated sigma values. This confidence determination can be adversely affected, however, under certain conditions. For example, an undetected interferer may be causing the incorrect energy to be located; or there may be an overconfidence in the bias values for signals of non-traditional shapes or timings; or signals may be transmitted from an object that may or may not be moving; or there may be sub-optimal receiver geometry.

As an overview of an aspect of the present disclosure, one or more ancillary parameter values, i.e., those produced during the geolocation process but not directly related to, or used in, the calculation of the geolocation, are processed to determine a confidence measure of the geolocation determination. Known geolocation approaches do not integrate these "ancillary" parameter can include signal characterization data and secondary measurements produced in the calculation of the geolocation, for example, residual outputs of the detection and demodulation of the signal, i.e., residual outputs that are not directly related to the calculation of the geolocation, as discussed below.

These parameter values are processed, in one approach, with respect to a weighted matrix in order to determine a Confidence or Fidelity value of the determined geolocation. Confidence, in this sense, is an indication of the likelihood, i.e., a level of confidence [0-1], or any other scale, that the geolocation result produced is in fact the desired target and that the identified location has a reasonable degree of quality so as to be practical or accurate. In other words, the confidence or fidelity value is a measure of whether the determined geolocation will contribute meaningful information to an observer.

Apart from the error ellipse and the associated sigma values used to calculate it, there are several other factors or parameters that, in accordance with aspects of the present disclosure, can be examined or processed to determine how confident one should be in a geolocation determination.

In accordance with various aspects of the present disclosure, these parameters include, but are not limited to, one or more of: a quality of demodulated bits used in the determination, a number of receivers used, a duty cycle of the signal in the geolocation snapshot, the use of demodulation/re-modulation processing, and the Cross Ambiguity Function (CAF) SNR. Generally, these parameters are available from, or characteristics of, the geolocation system but are not used in the geolocation determination.

In accordance with aspects of the present disclosure, as will be described in more detail below, each parameter can have a number of corresponding characteristics used to determine the confidence or fidelity value. These include, but are not limited to: 1) a weight used to determine how important the parameter is in relation to the other parameters; 2) one or more threshold ranges of values to which the parameter value is compared, or mapped; and 3) an impact weight or value for each of the one or more thresholds that is an indication of how much the geolocation determination will be affected when the parameter is within a respective threshold range of values.

In one aspect of the present disclosure, a system 100 for determining a geolocation of a target 105 is provided, as shown in FIG. 1. The system 100 includes a geolocation system 110 such as, for example, the N6854A Geolocation System and related sensors, available from Keysight Technologies of Santa Rosa, CA. A confidence metric generator (CMG) 120 is coupled to the geolocation system 110 to receive a number of geolocation system 110 parameters, as will be described below.

Figure 2:
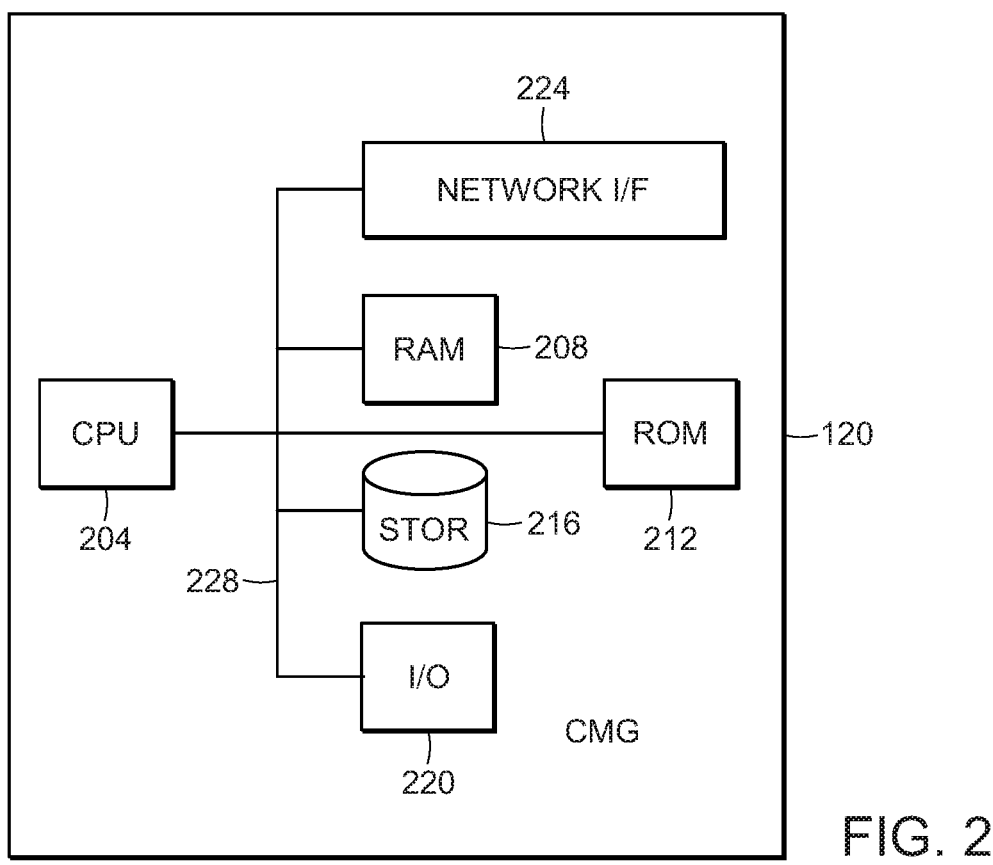
FIG. 2 is a confidence metric generator in accordance with an aspect of the present disclosure.

The CMG 120 includes a CPU 204; RAM 208; ROM 212; a mass storage device 216, for example, but not limited to, an SSD drive; an I/O interface 220 to couple to, for example, display, keyboard/mouse or touchscreen, or the like; and a network interface module 224 to connect, either wirelessly or via a wired connection, to outside of the system 100, as shown in FIG. 2. All of these modules are in communication with each other through a bus 228. The CPU 204 executes an operating system to operate and communicate with these various components as well as being programmed to implement aspects of the present disclosure as described herein.

Figure 3:
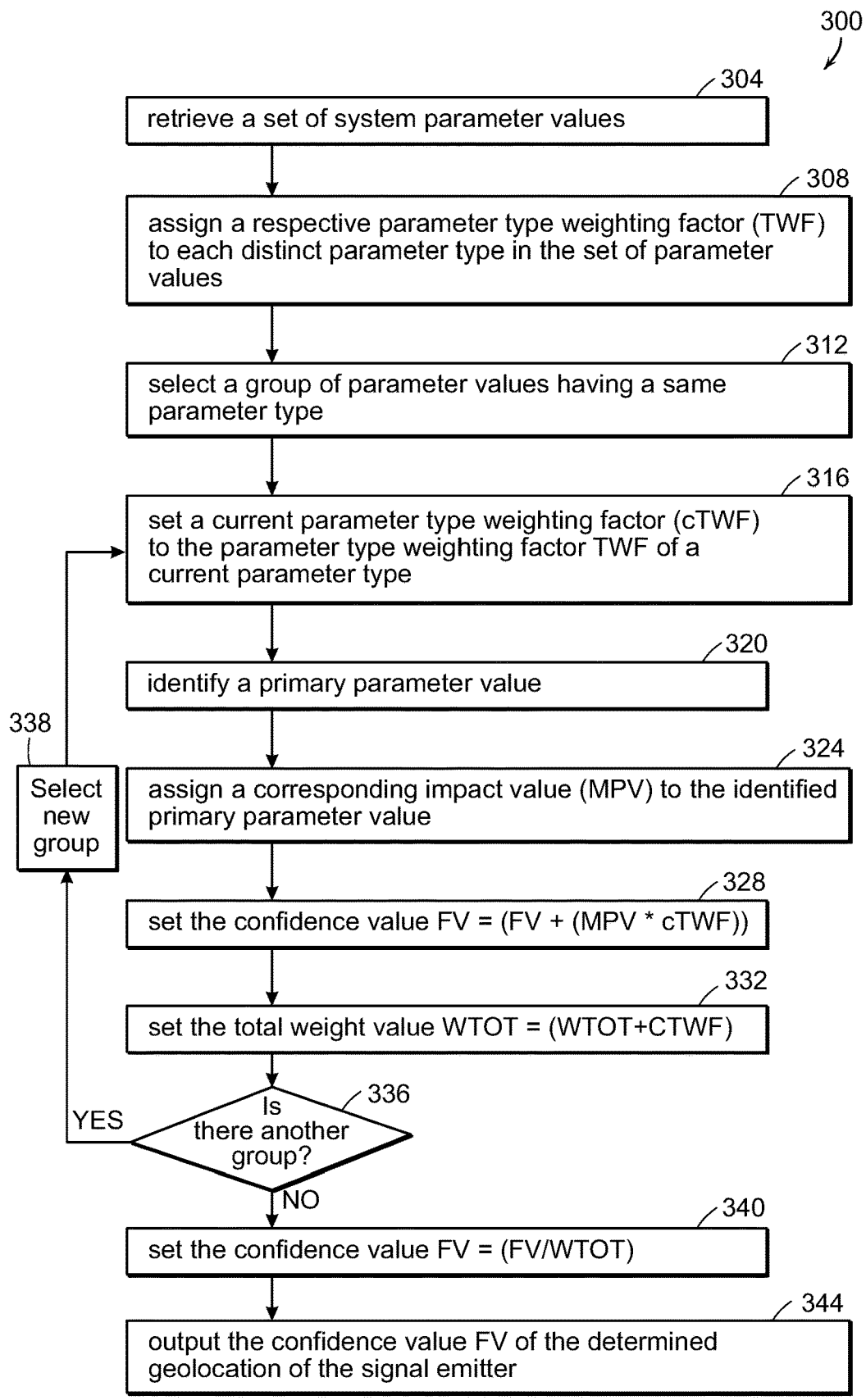
FIG. 3 is a flowchart of a method of determining a confidence value corresponding to a determined geolocation of a signal emitter in accordance with an aspect of the present disclosure.

A method 300 of determining a confidence value corresponding to a determined geolocation of a signal emitter in accordance with another aspect of the present disclosure will now be described with respect to FIG. 3. In a first step 304, a set of system parameter values is retrieved, with each parameter value having a respective parameter type. At step 308, a respective parameter type weighting factor (TWF) is assigned to each distinct parameter type in the retrieved parameter values set and at step 312 a group of retrieved geolocation system parameter values having a same parameter type is selected. For each group selected in step 312: at step 316, a current parameter type weighting factor (cTWF) to the parameter type weighting factor TWF of a current parameter type is set; at step 320, a primary parameter value is identified; at step 324, a corresponding impact value (MPV) is assigned to the identified primary parameter value; at step 328, the confidence value FV=(FV+(MPV*cTWF)) is set; and at step 332, the total weight value WTOT= (WTOT+cTWF) is set.

At step 336, it is determined if there is another group of parameter values that have a same parameter type and, if so, control passes to step 338 to select the new group and return to step 316. If there are no more groups to select, control passes to step 340. At step 340, the confidence value FV=(FV/WTOT) is set; and at step 344, the confidence value FV of the determined geolocation of the signal emitter is output.

In one aspect of the method 300, steps 312-336 are executed only after receiving an indication that the signal emitter geolocation has been determined. In another aspect of the method 300, step 312 only selects groups of parameter values where the corresponding parameter type weighting factor TWF≠0.

At step 320, in one aspect, identifying the primary parameter value can be one of, but is not limited to: determining a maximum value of the parameter values; determining a minimum value of the parameter values; determining a median value of the parameter values; determining an average value of the parameter values; or determining a standard deviation value of the parameter values.

Further, a parameter type can be, but is not limited to, one of: a measure of Cross Ambiguity Function (CAF) roughness; a measure of CAF Signal-Noise Ratio (CAF SNR); a measure of a number of signal collectors; a duty cycle value of signal from the signal emitter; an indication of use of demodulation/remodulation processing; or a measure of a quality of demodulated bits used in the geolocation determination.

As is known to one of ordinary skill in the art, the CAF surface is calculated from inputs from two receivers by performing a cross-correlation summation that results in a peak where, the signal intersects (in time and frequency), as a way of producing a time-difference or frequency-difference of the signal. The CAF-SNR is calculated during the geolocation process and is a ratio produced from points on the calculated CAF surface, e.g., the ratio of the power level of the peak of the CAF surface to the power level of the surface surrounding the peak. The power levels are calculated to create the 3-D CAF surface and the CAF-SNR is a standard measurement used to determine if the peak is above a threshold level to be considered as the energy one is looking for. The SNR of the CAF peak can be used to measure a confidence of the geolocation determination.

The foregoing is neither an exhaustive list of parameters that can be used or a limiting one as aspects of the present disclosure are extensible to any other parameters an implementer should wish to use and can be customized to behave differently for different signal types.

In one aspect of the method 300, at step 316, setting the respective parameter type weighting factor (TWF) to each distinct parameter type can be a function of a type of signal emitted by the signal emitter; and, at step 320, identifying a primary parameter value can be a function of the signal type; and, at step 324, assigning the corresponding impact value (MPV) to the identified primary parameter value can be a function of the signal.

In one aspect of the present disclosure, the MPV can be in the range, 0≤MPV≤1 and, prior to step 308, a step of setting the confidence value FV=0 and the total weight value WTOT=0 can be executed.

Figure 4:
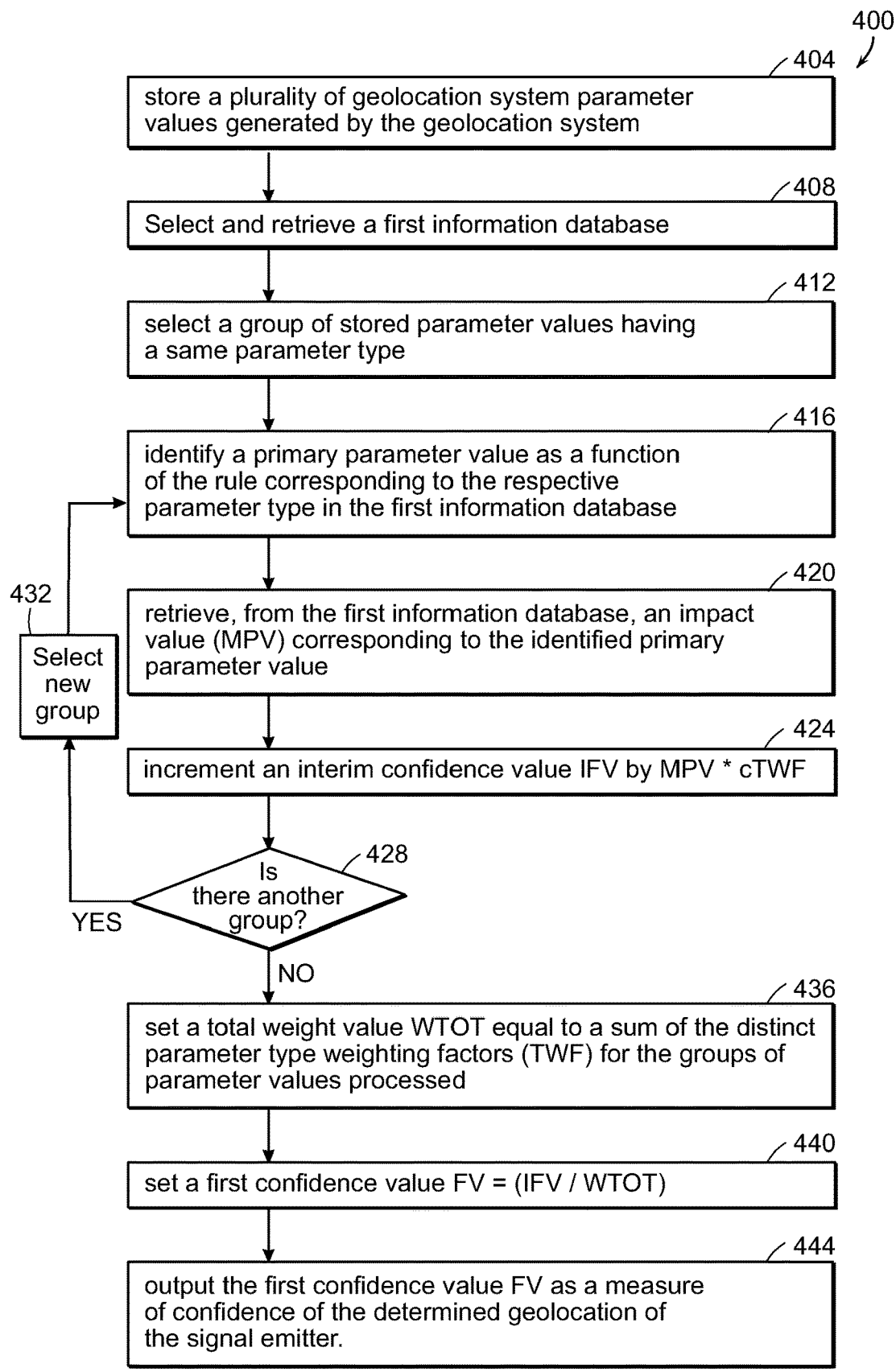
FIG. 4 is a flowchart of a method of determining a confidence value corresponding to a determined geolocation of a signal emitter in accordance with another aspect of the present disclosure.

In another aspect of the present disclosure, referring to FIG. 4, a method 400 of determining a confidence value corresponding to a geolocation of a signal emitter as determined by a geolocation system includes a step 404 of storing a plurality of geolocation system parameter values generated by the geolocation system during a process of determining the signal emitter's geolocation, where each system parameter value has a respective parameter type. At step 408, a first information database is selected and retrieved where the database comprises: a respective parameter type weighting factor (TWF) corresponding to each distinct parameter type; for each distinct parameter type: one or more impact values (MPV) where each MPV corresponds to a respective range of parameter values; and for each distinct parameter type: a rule for determining a primary parameter value. An example database will be discussed below.

Subsequently, for each group of stored geolocation system parameter values having a same parameter type, the following steps are executed: at step 416, a primary parameter value is identified as a function of the rule corresponding to the respective parameter type in the first information database; at step 420, an impact value (MPV) corresponding to the identified primary parameter value is retrieved from the first information database, and at step 424, an interim confidence value IFV is incremented by MPV*cTWF.

At step 428, it is determined if there is another group of parameter values that have the same parameter type and, if so, control passes to step 432 to select the new group and return to step 416. If no more groups to select, control passes to step 436, to set a total weight value WTOT equal to a sum of the distinct parameter type weighting factors (TWF) for the groups of parameter values processed in steps 416-424. At step 440, the method sets a first confidence value FV=IFV/WTOT; and at step 444, outputs the first confidence value FV as a measure of confidence of the determined geolocation of the signal emitter.

Referring now to FIG. 5, in one aspect of the present disclosure the first information database accessed in step 408 can be in the form of a table or matrix 500 with multiple rows and columns, as shown. Each row 502A-502D is of a respective Parameter Type 504, with a respective parameter type weight (TWF), a rule 512 for identifying a primary parameter value, one or more thresholds or ranges 516 and an impact value (MPV) 520 for each threshold or range 516.

For example, parameter type 502A "CAF-Roughness (CAFR)" has a parameter type weight (TWF) 508A of 0.5 and a rule 512A of "Minimum" that indicates when there are two or more values, the minimum value is identified and compared to the thresholds or ranges 516A-516D with corresponding Impact Values 520A-520D. Of course, it should be noted that the types of parameters, weights, ranges and impact values are merely for example and not intended to be limiting.

In one aspect of the present disclosure, a target motion indicator can be used to select a matrix 500 to be used in determining the confidence value. The target motion indicator is not available from a geolocation system and has two values or states for the status of the target: "moving" or "immobile." Whether a target is considered to be moving or not can have an impact on the confidence of the geolocation determination. Accordingly, if the target is considered "moving" then one set of parameter weights/thresholds/etc., e.g., a "moving" matrix 500, is used. If considered "immobile," then another set of parameter weights/thresholds/etc., e.g., an "immobile" matrix 500 is used. As a result, two fidelity values can be produced, one for when a target is considered (or assumed) to be in motion and one for a target considered (or assumed) to be immobile. A comparison of the two confidence values can be a further indication of the usefulness of the determined geolocation.

Merely as an example of the impact of a "moving" target compared to an "immobile" target, if there are only two receivers in the geolocation system, and the target is in motion, then the calculated geolocation (and ellipse) of the target can be significantly different from the target's actual location. Thus, in a weighting system where the target motion indicator is "moving," the number of receivers is weighted more heavily and, therefore, a system with only two receivers will have a lower confidence value assigned to its determination.

Returning to the method 400, in one aspect, steps 412-428 are executed only after receiving an indication that the signal emitter geolocation has been determined. In one aspect of the present disclosure, step 412 only selects groups of parameter values where the corresponding parameter type weighting factor TWF≠0.

At step 416, in an alternate aspect, identifying the primary parameter value can be one of, but is not limited to: determining a maximum value of the parameter values; determining a minimum value of the parameter values; determining a median value of the parameter values; determining an average value of the parameter values; or determining a standard deviation value of the parameter values.

Further, a parameter type can be, but is not limited to, one of: a measure of Cross Ambiguity Function (CAF) roughness; a measure of CAF Signal-Noise Ratio (CAF SNR); a measure of a number of signal collectors; a duty cycle value of signal from the signal emitter; an indication of use of demodulation/remodulation processing; or a measure of a quality of demodulated bits used in the geolocation determination. The foregoing is neither an exhaustive list of parameters that can be used or a limiting one as aspects of the present disclosure are extensible to any other parameters an implementer should wish to use and can be customized to behave differently for different signal types.

In one embodiment, at step 408, selecting and retrieving the first information database can be a function of the type of signal emitted by the signal emitter.

In another embodiment, the method 400 includes selecting and retrieving a second information database. The second information database comprises: a respective parameter type weighting factor (TWF) corresponding to each distinct parameter type; for each distinct parameter type: one or more impact values (MPV) where each MPV corresponds to a respective range of parameter values; and for each distinct parameter type: a rule for determining a primary parameter value, where at least one of: the TWF, the one or more MPVs or the determining rule differs from those in the first information database. Subsequently, steps 412-444 are executed for each group of stored geolocation system parameters using the second information database.

In one embodiment of the method 400, step 416 retrieves, from the first information database, an impact value (MPV) corresponding to the primary parameter value identified in step 416 by comparing the identified primary parameter value to each range of parameter values in the first information database.

Figure 6:
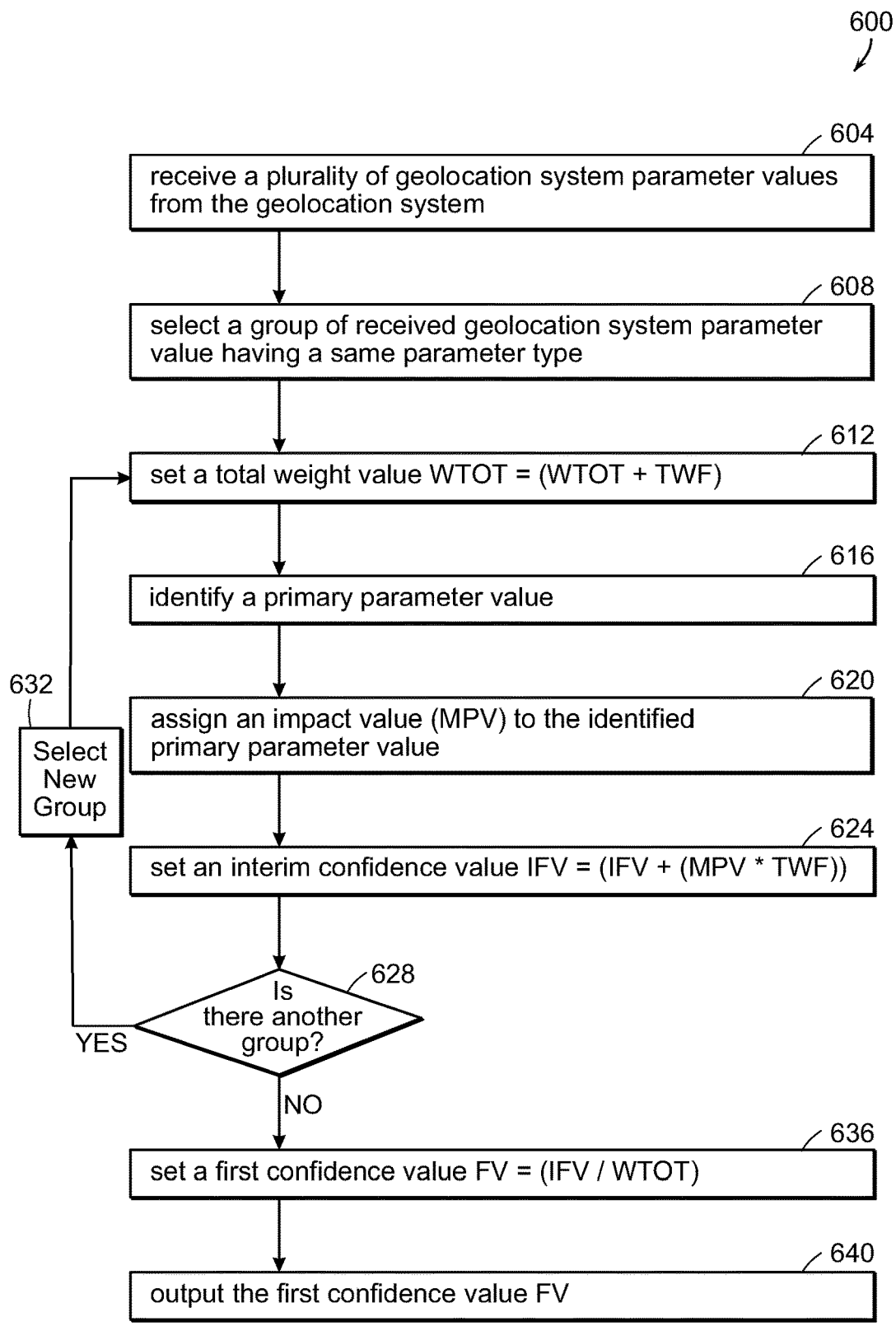
FIG. 6 is a flowchart of a method of determining a confidence value corresponding to a determined geolocation of a signal emitter in accordance with yet another aspect of the present disclosure.

In yet another aspect of the present disclosure, a method 600 of determining a confidence value corresponding to a determination of a geolocation of a signal emitter by a geolocation system is presented in FIG. 6. At step 604, a plurality of geolocation system parameter values are received from the geolocation system, each system parameter value having a respective parameter type, each parameter type having a respective weighting factor TWF. At step 608, a group of received geolocation system parameter values having a same parameter type is selected.

Subsequently, for each group selected in step 608, the method: at step 612, sets a total weight value WTOT= (WTOT+TWF); at step 616, identifies a primary parameter value; at step 620, assigns an impact value (MPV) to the primary parameter value identified in step 616; and at step 624, sets an interim confidence value IFV=(IFV+ (MPV*TWF)). At step 628, the method determines if there is another group of parameter values that have a same parameter type and, if so, control passes to step 632 to select the new group and return to step 612. If there are no more groups to select at step 628, control passes to step 636, to set a first confidence value FV=(IFV/WTOT); and at step 640, to output the first confidence value FV as a measure of confidence of the determined geolocation of the signal emitter.

Returning to the method 600, in one embodiment, steps 608-640 are executed only after receiving an indication that the signal emitter geolocation has been determined. In another embodiment, step 608 only selects groups of parameter values where the corresponding parameter type weighting factor TWF≠0.

At step 616, identifying the primary parameter value can be one of, but is not limited to: determining a maximum value of the parameter values; determining a minimum value of the parameter values; determining a median value of the parameter values; determining an average value of the parameter values; or determining a standard deviation value of the parameter values in yet another embodiment.

Further, a parameter type can be, but is not limited to, one of: a measure of Cross Ambiguity Function (CAF) roughness; a measure of CAF Signal-Noise Ratio (CAF SNR); a measure of a number of signal collectors; a duty cycle value of signal from the signal emitter; an indication of use of demodulation/remodulation processing; or a measure of a quality of demodulated bits used in the geolocation determination. The foregoing is neither an exhaustive list of parameters that can be used or a limiting one as aspects of the present disclosure are extensible to any other parameters an implementer should wish to use and can be customized to behave differently for different signal types.

In another embodiment of the method 600, a first information database is selected and stored. The first information database comprises: the respective parameter type weighting factor (TWF) corresponding to each distinct parameter type; for each distinct parameter type: one or more impact values (MPV) where each MPV corresponds to a respective range of parameter values; and for each distinct parameter type: a rule for determining a primary parameter value from a plurality of parameter values and steps 612-624 are executed with information from the first information database.

In another aspect of the method 600, a second information database is selected and stored. The second information database comprises: a respective parameter type weighting factor (TWF) corresponding to each distinct parameter type; for each distinct parameter type: one or more impact values (MPV) where each MPV corresponds to a respective range of parameter values; and for each distinct parameter type: a rule for determining a primary parameter value, where at least one of: the TWF, the one or more MPVs or the determining rule differs from those in the first information database; and steps 608-640 are executed for each group of stored geolocation system parameters using the second information database.

In one aspect of the method 600, step 620 retrieves, from the first information database, an impact value (MPV) corresponding to the primary parameter value identified in step 616 by comparing the identified primary parameter value to each range of parameter values in the first information database.

It should be noted that the values shown in the matrix 500 are for explanatory purposes only and not intended to be limited. One of ordinary skill in the art will understand that the values can be determined, without undue experimentation, by, for example, running a system against a known or "golden" system where the accuracy of the geolocation results are already known. Such a process could be an iterative process used to calibrate or confirm settings for a system as well as for different signal types.

Various embodiments of the above-described systems and methods may be implemented in digital electronic circuitry, in computer hardware, firmware, and/or software. The implementation can be as a computer program product, i.e., a computer program embodied in a tangible information carrier. The implementation can, for example, be in a machine-readable storage device to control the operation of data processing apparatus. The implementation can, for example, be a programmable processor, a computer and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

While the above-described embodiments generally depict a computer implemented system employing at least one processor executing program steps out of at least one memory to obtain the functions herein described, it should be recognized that the presently-described methods may be implemented via the use of software, firmware or alternatively, implemented as a dedicated hardware solution such as in a field programmable gate array (FPGA) or an application specific integrated circuit (ASIC) or via any other custom hardware implementation. Further, various functions, functionalities and/or operations may be described as being performed by or caused by software program code to simplify description or to provide an example. However, those skilled in the art will recognize what is meant by such expressions is that the functions result from execution of the program code/instructions by a computing device as described above, e.g., including a processor, such as a microprocessor, microcontroller, logic circuit or the like.

Control and data information can be electronically executed and stored on computer-readable medium. Common forms of computer-readable (also referred to as computer usable) media can include, but are not limited to including, for example, a floppy disk, a flexible disk, a hard disk, magnetic tape, or any other magnetic medium, a CD-ROM or any other optical medium, punched cards, paper tape, or any other physical or paper medium, a RAM, a PROM, and EPROM, a FLASH-EPROM, or any other memory chip or cartridge, or any other non-transitory medium from which a computer can read. From a technological standpoint, a signal encoded with functional descriptive material is similar to a computer-readable memory encoded with functional descriptive material, in that they both create a functional interrelationship with a computer. In other words, a computer is able to execute the encoded functions, regardless of whether the format is a disk or a signal.

It is to be understood that aspects of the present disclosure have been described using non-limiting detailed descriptions of embodiments thereof that are provided by way of example only and are not intended to limit the scope of the disclosure. Features and/or steps described with respect to one embodiment may be used with other embodiments and not all embodiments have all of the features and/or steps shown in a particular figure or described with respect to one of the embodiments. Variations of embodiments described will occur to persons of skill in the art.

It should be noted that some of the above described embodiments include structure, acts or details of structures and acts that may not be essential but are described as examples. Structure and/or acts described herein are replaceable by equivalents that perform the same function, even if the structure or acts are different, as known in the art, e.g., the use of multiple dedicated devices to carry out at least some of the functions described as being carried out by the processor. Therefore, the scope of the present disclosure is limited only by the elements and limitations as used in the claims.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A method of determining a confidence value (FV) corresponding to a signal emitter geolocation determined by a geolocation system, the method comprising:
    retrieving a set of geolocation system parameter values generated by the geolocation system while determining the signal emitter geolocation, wherein each system parameter value has a respective parameter type and at least one of the system parameter values is of a type that is not used by the geolocation system to determine the signal emitter geolocation; and
    determining the confidence value (FV) as a function of at least one of:
        a respective parameter type weighting factor (TWF) assigned to each distinct parameter type in the retrieved parameter values set;
        a sum of the TWFs in the retrieved parameter value set;

a primary parameter value identified for each group of retrieved geolocation system parameter values having a same parameter type; and
a corresponding impact value (MPV) assigned to the identified primary parameter value.

2. The method of claim 1, further comprising:
determining the confidence value (FV) as a function of at least one of:
a rule for determining the primary parameter value; and
a comparison of the primary parameter value to at least one threshold range,
wherein the corresponding impact value (MPV) is assigned to the identified primary parameter value as function of the comparison of the primary parameter value to at least one threshold range.

3. The method of claim 2, wherein the rule for identifying the primary parameter value comprises one of:
determining a maximum value of the parameter values;
determining a minimum value of the parameter values;
determining a median value of the parameter values;
determining an average value of the parameter values; or
determining a standard deviation value of the parameter values.

4. The method of claim 1, wherein a parameter type is one of:
a measure of Cross Ambiguity Function (CAF) roughness;
a measure of CAF Signal-Noise Ratio (CAF SNR);
a measure of a number of signal collectors;
a duty cycle value of a signal from the signal emitter;
an indication of use of demodulation/remodulation processing; or
a measure of a quality of demodulated bits used in the geolocation determination.

5. The method of claim 1, further comprising:
assigning a respective parameter type weighting factor (TWF) to each distinct parameter type in the retrieved parameter values set;
for each group of retrieved geolocation system parameter values having a same parameter type:
(a) setting a current parameter type weighting factor (cTWF) to the parameter type weighting factor TWF of the current parameter type;
(b) identifying the primary parameter value;
€ assigning a corresponding impact value (MPV) to the identified primary parameter value;
(d) setting the confidence value FV=(FV+(MPV*cTWF)); and
€ setting the total weight value WTOT=(WTOT+cTWF); and
setting the confidence value FV=(FV/WTOT) when steps (a)-€ have been executed for each group of retrieved geolocation system parameter values having a same parameter type.

6. The method of claim 5, further comprising:
assigning the respective parameter type weighting factor (TWF) to each distinct parameter type as a function of a type of signal emitted by the signal emitter;
identifying the primary parameter value as a function of the type of signal emitted by the signal emitter; and
assigning the corresponding impact value (MPV) to the identified primary parameter value as a function of the type of signal emitted by the signal emitter.

7. The method of claim 5, further comprising:
selecting and retrieving a first information database comprising:

the respective parameter type weighting factor (TWF) corresponding to each distinct parameter type;
for each distinct parameter type: one or more impact values (MPV) where each MPV corresponds to a respective range of parameter values; and
for each distinct parameter type: a rule for determining a primary parameter value; and
determining the confidence value using the first information database.

8. The method of claim 7, further comprising:
selecting and retrieving a second information database comprising:
a respective parameter type weighting factor (TWF) corresponding to each distinct parameter type;
for each distinct parameter type: one or more impact values (MPV) where each MPV corresponds to a respective range of parameter values; and
for each distinct parameter type: a rule for determining a primary parameter value,
wherein at least one of: the TWF, the one or more MPVs or the determining rule differs from those in the first information database; and
determining a second confidence value using the second information database.

9. The method of claim 8, wherein:
values in the first information database are predetermined with respect to a moving signal emitter; and
values in the second information database are predetermined with respect to an immobile signal emitter.

10. A system for determining a confidence value (FV) corresponding to a signal emitter geolocation as determined by a geolocation system, the system comprising:
a processor coupled to the geolocation system and configured to implement a method of:
retrieving a set of geolocation system parameter values generated by the geolocation system while determining the signal emitter geolocation, wherein each system parameter value has a respective parameter type and at least one of the system parameter values is of a type that is not used by the geolocation system to determine the signal emitter geolocation; and
determining the confidence value (FV) as a function of at least one of:
a respective parameter type weighting factor (TWF) assigned to each distinct parameter type in the retrieved parameter values set;
a sum of the TWFs in the retrieved parameter value set;
a primary parameter value identified for each group of retrieved geolocation system parameter values having a same parameter type; and
a corresponding impact value (MPV) assigned to the identified primary parameter value.

11. The system of claim 10, the method further comprising:
determining the confidence value (FV) as a function of at least one of:
a rule for determining the primary parameter value; and
a comparison of the primary parameter value to at least one threshold range,
wherein the corresponding impact value (MPV) is assigned to the identified primary parameter value as function of the comparison of the primary parameter value to at least one threshold range.

12. The system of claim 10, wherein a parameter type is one of:
a measure of Cross Ambiguity Function (CAF) roughness;

a measure of CAF Signal-Noise Ratio (CAF SNR);
a measure of a number of signal collectors;
a duty cycle value of a signal from the signal emitter;
an indication of use of demodulation/remodulation processing; or
a measure of a quality of demodulated bits used in the geolocation determination.

13. The system of claim 10, the method further comprising:
assigning a respective parameter type weighting factor (TWF) to each distinct parameter type in the retrieved parameter values set;
for each group of retrieved geolocation system parameter values having a same parameter type:
(a) setting a current parameter type weighting factor (cTWF) to the parameter type weighting factor TWF of the current parameter type;
(b) identifying the primary parameter value;
€ assigning a corresponding impact value (MPV) to the identified primary parameter value;
(d) setting the confidence value FV=(FV+(MPV*cTWF)); and
€ setting the total weight value WTOT=(WTOT+cTWF); and
setting the confidence value FV=(FV/WTOT) when steps (a)-€ have been executed for each group of retrieved geolocation system parameter values having a same parameter type.

14. The system of claim 13, the method further comprising:
selecting and retrieving a first information database comprising:
the respective parameter type weighting factor (TWF) corresponding to each distinct parameter type;
for each distinct parameter type: one or more impact values (MPV) where each MPV corresponds to a respective range of parameter values; and
for each distinct parameter type: a rule for determining a primary parameter value; and
determining the confidence value using the first information database.

15. The system of claim 14, the method further comprising:
selecting and retrieving a second information database comprising:
a respective parameter type weighting factor (TWF) corresponding to each distinct parameter type;
for each distinct parameter type: one or more impact values (MPV) where each MPV corresponds to a respective range of parameter values; and
for each distinct parameter type: a rule for determining a primary parameter value,
wherein at least one of: the TWF, the one or more MPVs or the determining rule differs from those in the first information database; and
determining a second confidence value using the second information database.

16. A tangible computer-readable medium storing instructions thereon that, when executed by a processor coupled to a geolocation system, causes the processor to implement a method of determining a confidence value corresponding to a determination of a geolocation of a signal emitter by the geolocation system, the method comprising:
retrieving a set of geolocation system parameter values generated by the geolocation system while determining the signal emitter geolocation, wherein each system parameter value has a respective parameter type and at least one of the system parameter values is of a type that is not used by the geolocation system to determine the signal emitter geolocation; and
determining the confidence value (FV) as a function of at least one of:
a respective parameter type weighting factor (TWF) assigned to each distinct parameter type in the retrieved parameter values set;
a sum of the TWFs in the retrieved parameter value set;
a primary parameter value identified for each group of retrieved geolocation system parameter values having a same parameter type; and
a corresponding impact value (MPV) assigned to the identified primary parameter value.

17. The tangible computer-readable medium of claim 16, the method further comprising:
determining the confidence value (FV) as a function of at least one of:
a rule for determining the primary parameter value; and
a comparison of the primary parameter value to at least one threshold range,
wherein the corresponding impact value (MPV) is assigned to the identified primary parameter value as function of the comparison of the primary parameter value to at least one threshold range.

18. The tangible computer-readable medium of claim 16, the method further comprising:
assigning a respective parameter type weighting factor (TWF) to each distinct parameter type in the retrieved parameter values set;
for each group of retrieved geolocation system parameter values having a same parameter type:
(a) setting a current parameter type weighting factor (cTWF) to the parameter type weighting factor TWF of the current parameter type;
(b) identifying the primary parameter value;
€ assigning a corresponding impact value (MPV) to the identified primary parameter value;
(d) setting the confidence value FV=(FV+(MPV*cTWF)); and
€ setting the total weight value WTOT=(WTOT+cTWF); and
setting the confidence value FV=(FV/WTOT) when steps (a)-€ have been executed for each group of retrieved geolocation system parameter values having a same parameter type.

19. The tangible computer-readable medium of claim 18, the method further comprising:
selecting and retrieving a first information database comprising:
the respective parameter type weighting factor (TWF) corresponding to each distinct parameter type;
for each distinct parameter type: one or more impact values (MPV) where each MPV corresponds to a respective range of parameter values; and
for each distinct parameter type: a rule for determining a primary parameter value; and
determining the confidence value using the first information database.

20. The tangible computer-readable medium of claim 19, the method further comprising:
selecting and retrieving a second information database comprising:
a respective parameter type weighting factor (TWF) corresponding to each distinct parameter type;

for each distinct parameter type: one or more impact values (MPV) where each MPV corresponds to a respective range of parameter values; and for each distinct parameter type: a rule for determining a primary parameter value, wherein at least one of: the TWF, the one or more MPVs or the determining rule differs from those in the first information database; and determining a second confidence value using the second information database.

* * * * *